United States Patent

[11] 3,565,199

| [72] | Inventor | Robert J. Mistarz |
| | | Northbrook, Ill. |
| [21] | Appl. No. | 792,041 |
| [22] | Filed | Jan. 17, 1969 |
| [45] | Patented | Feb. 23, 1971 |
| [73] | Assignee | Chicago Stainless Equipment Corporation |
| | | a corporation of Illinois |

[54] SPEED CONTROL FOR CARTS
5 Claims, 4 Drawing Figs.

[52] U.S. Cl. ............................................. 180/19
[51] Int. Cl. ........................................... B62d 51/04
[50] Field of Search .................................. 180/19, 19 (H), 65

[56] References Cited
UNITED STATES PATENTS

| 2,815,083 | 12/1957 | Ellingsworth | 180/19(H) |
| 2,957,534 | 10/1960 | Burdett | 180/19(H) |
| 2,962,106 | 11/1960 | Burnside et al. | 180/19(H) |
| 3,150,735 | 9/1964 | Kaufman | 180/19(H) |
| 3,380,546 | 4/1968 | Rabjohn | 180/19X |

*Primary Examiner*—Leo Friaglia
*Assistant Examiner*—John A. Pekar
*Attorney*—Hofgren, Wegner, Allen, Stellman and McCord ABSTRACT: A motor-driven wheeled cart such as a golf cart having a drive motor which may be battery operated, a projecting guide handle to be grasped by an operator in guiding the cart in a desired path, a switch for turning the motor on and off, a variable speed control for controlling the speed of the motor and thereby the speed of the cart with the handle being movable in one direction to operate the on-off switch and movable in another direction to operate the speed control.

PATENTED FEB 23 1971  3,565,199
FIG.1
FIG.3
FIG.2
FIG.4
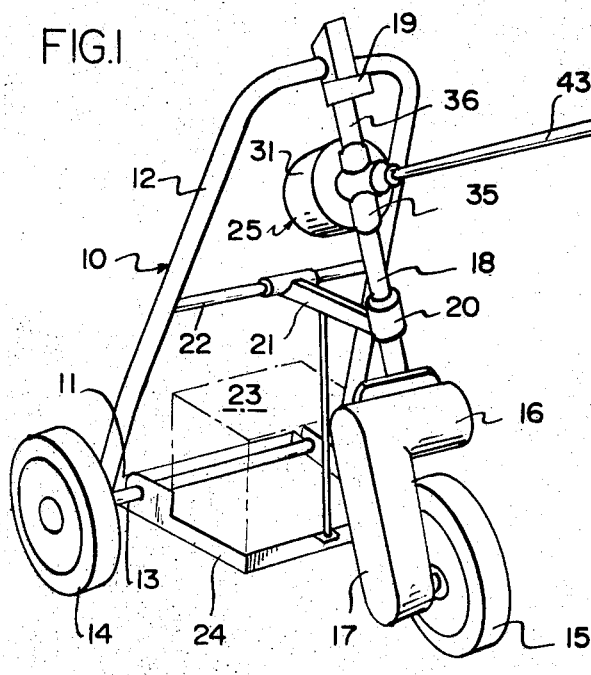
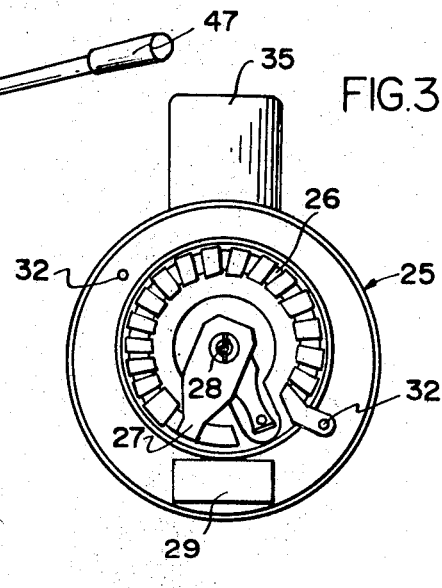
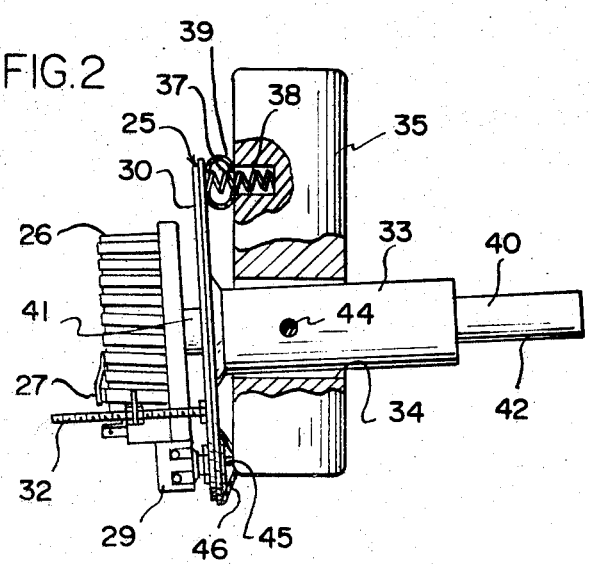
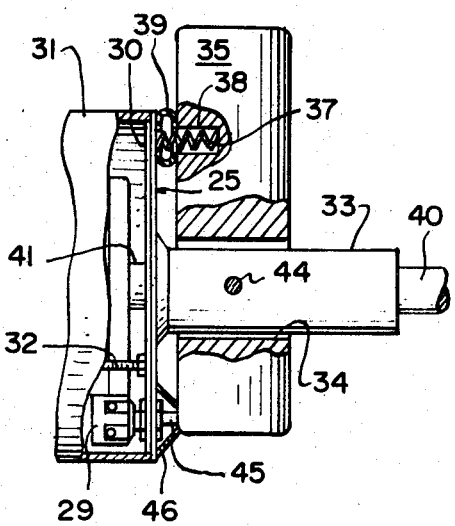
INVENTOR.
ROBERT J. MISTARZ
BY Hofgren, Wegner, Allen, Stellman & McCord.

SPEED CONTROL FOR CARTS

It is customary to provide small transportation carts that can be hand propelled over a surface. Such a cart is a golf cart for transporting a golf bag with a handle that can be used to propel the cart over the surface such as the golf course. In the cart of this invention there is provided a motor drive so that the cart does not have to be dragged over the golf course or the like and the projecting handle is used to selectively energize and deenergize the motor and also for controlling the speed. In addition, in the preferred construction the switch and handle relationship is such that upon release of the handle by the operator the switch is automatically operated. Thus when the operator is guiding the cart with the motor functioning and therefore the switch in the on position the release of the handle by the operator automatically moves the switch to the off or open position.

The invention will be described as related to the embodiment shown in the accompanying drawings. Of the drawings:

FIG. 1 is a perspective view of a golf cart embodying the invention with the golf bag omitted for clarity of illustration.

FIG. 2 is a detailed elevation partially in section and illustrating the switch and speed control portion of the apparatus.

FIG. 3 is a side elevational view taken from the left of FIG. 2.

FIG. 4 is a view similar to FIG. 2 but showing the parts in another position.

In the embodiment of FIG. 1 the cart 10 is a golf cart having means including a rear bottom shelf 11 for supporting a golf bag which is not shown. The cart 10 includes a frame 12 at the bottom of which is located an axle 13 on the opposite ends of which are located a pair of wheels 14 which together with a front wheel 15 constitute a three-wheel support for the cart.

Located above the front wheel 15 is an electric motor in a casing 16 for driving the wheel 15 through a drive mechanism located in a housing 17. The motor casing 16, housing 17 and front wheel 15 comprise a drive unit which is mounted on the bottom of a bar 18 which extends upwardly and rearwardly and which is rotatably held in vertically spaced mounting brackets 19 and 20 that are attached and form a part of the frame 12 of the cart. Thus the bar 18 is arcuately movable about its longitudinal axis in guiding the cart 10 over the terrain.

The upper bracket 19 is attached directly to the top of the frame 12. The lower bracket 20 is attached to the forward end of a bracket 21 that extends forwardly from a crossbar 22 that forms part of the frame 12.

The battery which supplies power to the drive motor is located at 23. This battery is held on a substantially horizontal platform 24 which is mounted on the axle 13 and the mounting bracket 21.

Mounted adjacent the upper end of the vertical bar 18 is a combined speed control and motor switch unit 25. This unit comprises a circular rheostat 26 speed control having an arcuately movable contact arm 27 that is movable about a central axis 28 in energizing the motor from low to highest speed. Also forming a part of the unit 25 is a snap action on-off switch 29.

The base 30 of the unit 25 is of generally circular shape and normally carries a cylindrical cover 31 to enclose the speed control rheostat 26 and switch 29. FIGS. 2 and 3 show the unit with the cover removed. This cover is releasably held in position by a pair of elongated mounting bolts 32.

The base 30 of the unit 25 is attached to the rear end of a sleeve 33 that extends through an opening 34 in a metal cylinder 35. As shown in FIG. 1 this cylinder 35 has its lower end mounted on the upper end of the vertical bar 18 which is in two parts with an upper part 36 extending upwardly from the cylinder 35 to engage the top mounting bracket 19 as described.

The base 30 and thus the unit 25 itself is biased to the position shown in FIG. 2 by an upper compression spring 37 whose inner end is retained in a recess 38 in the cylinder 35 and whose outer end bears against the top of the base plate 30. For protective purposes this outer end of the spring is enclosed in a flexible sleeve 39 which may conveniently be made of rubber.

Located within the sleeve 33 is a rod 40 of generally cylindrical shape which is arcuately movable within the sleeve. One end 41 of the rod 40 is attached to the contact arm so that the longitudinal axis of this rod substantially coincides with the axis 28 of movement of the contact arm. The other end 42 of the rod 40 is releasably attachable to an elongated projecting handle 43 as shown in FIG. 1.

The sleeve 33 is mounted in the opening 34 on a pair of side aligned pins 44 so that the sleeve 33 and thus the control unit 25 may be rocked about these pins 44.

The on-off control switch 29 for the unit 25 is mounted on the lower end of the base plate 30. Extending forwardly from this switch 29 is an operating pin 45 that extends to the lower end of the cylinder 35. This pin 45 is protected by a flexible rubber enclosure 46.

The sleeve 33 is of smaller diameter than the diameter of the opening 34 in which it is located. This means that the sleeve 33 may be rocked in a generally vertical plane in this opening about the side aligned pins 44. The upper spring 37 always urges the sleeve 33 and unit 25 in a counterclockwise direction as viewed in FIGS. 2 and 3. The pin 45 of the switch 29 is always urged to the left as viewed in FIGS. 2 and 4 so that the spring 37 which urges the plate 30 the position of FIG. 2 holds the pin 45 retracted in one "snap" position as shown. When the plate is rocked about the pins 44 to the position shown in FIG. 4 the pin 45 snaps out as shown.

In operating the structure of this invention arcuate movement of the control handle 43 which is mounted on the end 42 of the rod 40 causes movement of the contact arm 27 against the rheostat 26 to control the speed of the cart through the powered motor. The handle 43 is also used to guide the cart in a desired direction by moving the handle as required to the right or to the left. Downward pressure on the handle 43 by the operator snaps the switch 29 from one position to its opposite position. Thus if the switch is in the off position this downward pressure snaps it to the on position to power the cart. The speed of the cart can be regulated as described by arcuately moving the handle 43 about its longitudinal axis.

As can be noted, the handle 43 is of considerable length and the fulcrum pins 44 are near the rear end of the handle structure. However when the hand engageable portion 47 of the handle is released by the operator the weight of the handle will be overcome by the spring causing it to rock upwardly about the fulcrum pins 44 and snap the switch 29 to the opposite open position. This means that if the switch 29 (which is of the normally open type) is in its on position the release by the operator automatically moves the switch to its off or deenergized position to stop the cart.

Thus the handle 43 may be used not only to control electric energization of the cart, as described, by rocking the handle about its fulcrum 44 to operate the switch 29 but is also used to control the speed of the cart.

The handle 43 therefore is a guide handle for guiding the direction of movement of the cart, a speed control, an on-off control and a means for propelling the cart over the course when the motor is deenergized. The switch 29 comprises a switch means for controlling the energization of the motor and is movable between on and off positions. The rheostat 26 comprises a variable speed control means for controlling the speed of the motor and thus of the cart. Movement of the handle in one direction, which in this embodiment is the rocking movement about the fulcrum pin 44, operates the switch means. Rotation of the handle in a second direction, which in this embodiment is arcuate movement about the longitudinal axis of the handle, operates the speed control means.

I claim:

1. A motor-driven wheeled cart, comprising: a drive motor; a projecting guide handle adapted to be grasped by an operator in guiding said cart in a desired path; switch means for controlling energization of said motor movable between on and off positions; variable speed control means for controlling the speed of said motor and thus of said cart; means mounting said handle for movement in one direction; means mounting said handle for movement in a second direction; means operably interconnecting said handle and switch means for operation thereof between said on and off positions on said movement of the handle in said one direction; means operably interconnecting said handle and speed control means for operation thereof on said movement of the handle in said second direction, and means for automatically moving said handle in said one direction from switch-on to switch-off upon release of the handle by the operator.

2. The cart of claim 1 wherein said handle is elongated with a longitudinal axis, and said one direction is arcuately about an axis.

3. The cart of claim 1 wherein said means mounting said handle for movement is said one direction comprises fulcrum means about which said handle is rockable in said one direction movement.

4. The cart of claim 3 wherein said fulcrum means is located adjacent said switch means and there is provided spring means urging said handle in said one direction upon release of the handle.

5. The cart of claim 1 wherein said handle is elongated with a longitudinal axis, said second direction is arcuately about said axis, said means mounting said handle for movement in said one direction comprises fulcrum means about which said handle is rockable in said one-direction movement, and said fulcrum means is located adjacent said switch means and there is provided spring means urging said handle in said one direction upon release of the handle.